April 27, 1965 G. D. HAWK 3,179,995
SAFETY PIN
Filed Jan. 20, 1964
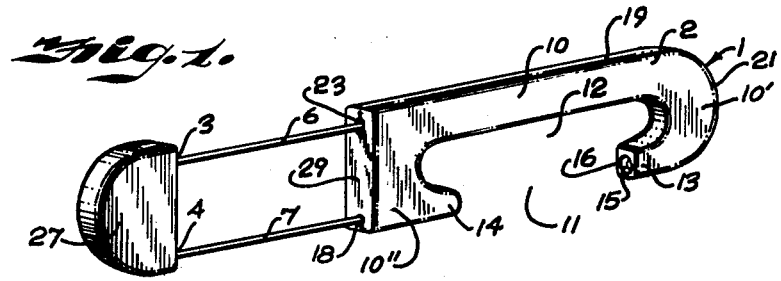
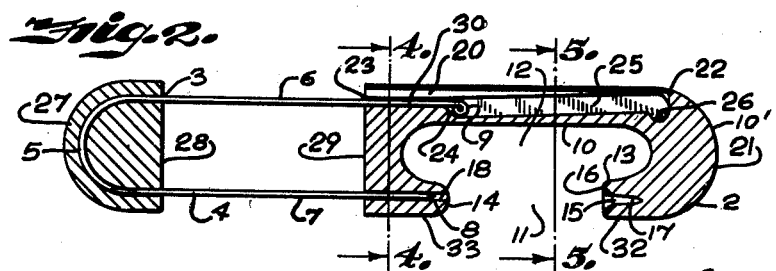
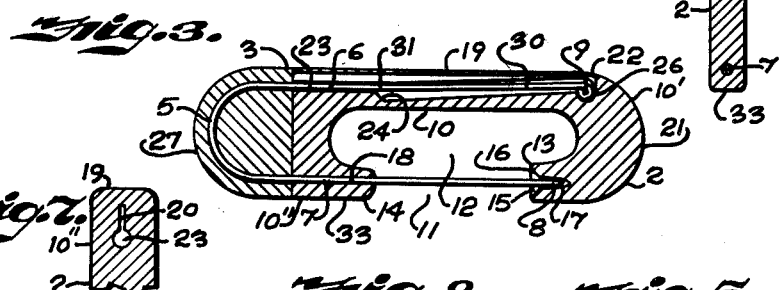
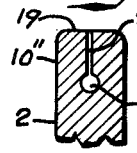
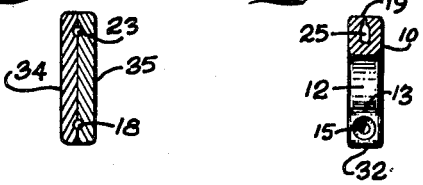
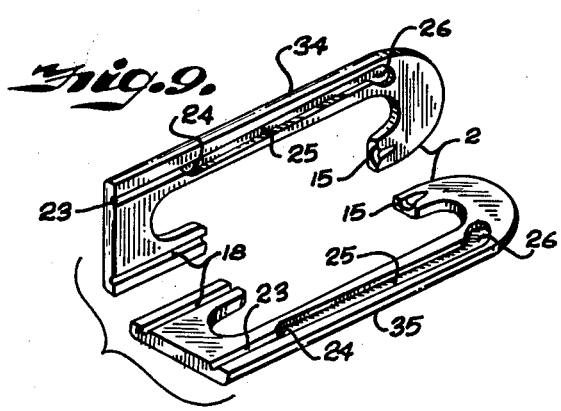
INVENTOR.
GARY D. HAWK
BY
Fishburn & Gold
ATTORNEYS United States Patent Office 3,179,995
Patented Apr. 27, 1965

3,179,995
SAFETY PIN
Gary D. Hawk, 6901 W. 77th St., Overland Park, Kans.
Filed Jan. 20, 1964, Ser. No. 338,960
4 Claims. (Cl. 24—158)

This invention relates to a safety pin, and more particularly to a safety pin having a main body member and a pin member whereby the pin member is slidable in the body member to close the pin.

The safety pin is primarily designed for use in fastening diapers on babies and to eliminate the possibility of sticking the baby or infant with a sharp pointed pin as now in use.

The principal object of the present invention, therefore, is to provide a pin whereby the diaper may be placed around the baby and by folding the same over, the foldover portion is inserted through the open side of the main body of the pin and the pin portion of the safety pin pushed forwardly through the material in a straight line and the point engaged in a socket on the body member.

Other objects of the present invention are to provide a safety pin having a body member of elongated form having an open side and the opposite side having a longitudinal slot therein, the open side having facing portions or points, one of which has an opening therethrough and the other has a socket; to provide a pin portion for movement in the body portion; to provide a pin portion having a U-shaped member, one shank of which is pointed and engages through the opening in one of the pointed portions of the body member and the other leg of which is slidable in a bore intersecting the slot in the opposite side of the body member; and to provide a pin portion with an end member whereby the pin portion may be grasped and slidably movable with respect to the body member of the pin.

Still further objects of the present invention are to provide the body member of a slightly resilient or yieldable material whereby the slot in the body portion of the pin may be closed by heat after the shank of the pin member is inserted therethrough into the longitudinal bore opening; to provide the bore opening with an offset portion and then a slightly inclined portion away from said compartment of the body member terminating in a socket at the terminal end of said bore; to provide the shank of the pin member with an enlarged end whereby when the pin member is pushed forwardly into the body member the enlarged end will follow the socket and be spread slightly apart from the pin point of the pin and then engaged in the socket in said bore to lock the pin into position; to provide the pin portion of the safety pin with parallel extending shanks wherein they are normally equal distance apart at the rear end of the body member and the terminal point of the bore in the body member and the socket in one point of the body member will be slightly greater distance apart so that when the shank of the pin is placed in the bore through the slot, it will be slightly on a tension until the enlarged pin engages in the enlarged portion of the bore; to provide a pin portion that in normal relation will slide forwardly into the body member so that the pin point will always engage in the socket of the point of the body member facing the pin point.

Still further objects of the present invention are to provide a two-piece body member wherein a socket is formed in the sides of the body member and wherein no groove or slot is provided, but by making the device in two pieces they can be sealed together after the pin portion is engaged with the body portion; and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a perspective view of my safety pin shown in open position.

FIG. 2 is a longitudinal cross-sectional view showing the pin portion engaged in the body portion and in open position.

FIG. 3 is a longitudinal cross-sectional view showing the pin closed.

FIG. 4 is a cross-sectional view taken on a line 4—4, FIG. 2.

FIG. 5 is a cross-sectional view taken on a line 5—5, FIG. 2.

FIG. 6 is a fragmentary enlarged cross-sectional view showing the slit and bore opening in the closed side of the main body portion of the pin.

FIG. 7 is a fragmentary cross-sectional view showing the slot after heat sealing.

FIG. 8 is a cross-sectional view showing the bore opening for both of the shanks of the pin.

FIG. 9 is a modified form of the body portion of the safety pin wherein the body portion is made in two pieces and sealed together.

Referring more in detail to the drawings:

Common use for safety pins is for pinning together one or more layers of fabric and the present pin is designed to secure articles of clothing, such as diapers and the like, about an infant. The safety pin body may be made of metal, plastic, or other suitable materials and I have found polypropylene and poly-ethylene suitable as plastic materials for the body of the pin, the shanks of the pin are made of metal.

1 designates a safety pin embodying the features of my invention comprising an elongated main body member 2 and a pin portion 3. The pin portion consists of a metal member 4 bent upon itself as indicated at 5 forming parallel legs or shanks 6 and 7. The shank 6 is slightly longer than the shank 7, the shank 7 has a pointed end as indicated at 8 (FIG. 2). The free end of the shank 6 is turned upon itself to form an enlarged end as indicated at 9 (FIG. 2).

The main body member 2 is preferably made of plastic material and has an elongated bar portion 10, front end 10', rear end 10" and an open side 11 with an enlarged space therein forming a compartment 12. The compartment 12 forms facing point portions 13 and 14, respectively along the open side of the main body member 2. The points 13 and 14 face each other and the point 13 is provided with a socket 15 slightly larger at the face of the point as indicated at 16 and tapered inwardly to a point as indicated at 17 (FIG. 2). The point portion 14 has an elongated bore 18 extending therethrough through which the shank 7 of the pin portion 3 extends. The upper side edge 19 of the bar portion 10 is provided with a slot or slit 20 and the front end 10' of the body portion is rounded as indicated at 21. The slot 20 extends from the end 10" to substantially the beginning of the rounded portion 21 as indicated at 22.

In alignment with the slot 20 and intersecting therewith is a longitudinal bore 23 for receiving the shank 6 of the pin portion of the safety pin. The bore 23 extends parallel with the bore 18 to retain the shank 7 permanently in alignment with the socket 15 and is offset as indicated at 24 (FIG. 2) forming an enlarged bore which extends to substantially the terminal point of the slot portion 20 of the body portion as illustrated in FIG. 2. The extreme end of the enlarged socket portion 25 is provided with a depression as indicated at 26 to form a lock for the shank 6 as later described. It will be noted in FIG. 2 the enlarged bore portion 25 extends slightly upwardly at an angle toward end 21 of the body portion or away from the compartment 12, also for purpose later described.

The body portion 2 of the safety pin may be formed in a mold with the slot, bore, and sockets therein as indicated and the pin portion 4 has molded on the rounded end 5 a body member 27 of the same size and has a forward end 28 to face and fit against the rearwardly extending face 29 of the body portion 2 as shown in FIG. 3 when the pin is closed.

With the body portion and pin portion of the safety pin constructed as described the end 30 of the shank or leg member 6 is pressed through the slit 20 and into the bore 23 of the body portion near the end 29 thereof and the point 8 of the leg or shank 7 of the pin portion is entered in the bore 18 of the point portion 14 of the body 2 and movement of the pin portion toward the body portion will cause the enlarged end 9 of the shank 6 to pass over the offset shoulder portion 24 and the shanks 6 and 7 maintained an equal distance apart from the shoulder portion 24 to the facing edge 29 of the rear end of the body portion to hold the point of the shank 7 directly in line with the socket 15 in the pointed portion 13 of the body member 2. At this point the shank 6 retains the pin portion of the safety pin in slidable relation to the body portion and the enlarged end 9 will prevent accidental displacement of the pin portion with respect to the body portion. The layers of cloth of the diaper or other material is then gathered together in the compartment 12 of the body portion of the pin as is the usual practice and forward movement of the pin portion 3 through pressure on the body portion 27 of the pin member 3 will cause the point 8 of the shank 7 to pass through the garment material (not shown) and move into the socket 15 of the body portion. As the pin portion 3 moves forwardly the enlarged portion 9 of the shank 7 will move upwardly slightly in the enlarged bore 25 until the enlarged portion engages the socket portion 26 when it will move thereinto and at which time the point 8 of the shank 7 is in position in the socket 15 as shown in FIG. 3 and the pin will be in closed, normally locked position. In this position the shank 6 of the pin will be slightly bent at the shoulder portion 24 as indicated at 31 (FIG. 3) so that the tension of the free end of the shank 6 will normally be toward the point of the pin, but from the shoulder 24 to the face 29 of the body portion the shank is held in straight position so that the point of the shank 7 will always be pointed toward the socket 15.

After the shank 6 is inserted through the slot 20 into the bore 23 heat may be applied to the edge 19 of the body portion to seal the slot partially together as illustrated in FIG. 7 to retain the shank 6 therein. Any type of heat may be used such as a common iron or the like.

It will be obvious that even should the side edges 32 and 33 of the pointed portions 13 and 14 of the body 2 be against the infant's body, the point of the pin will still not contact the body. Usually the fingers of the hand are between the body of the infant and the diaper, but with this type of safety pin even the body of the pin may lie against the infant's body and will not injure the infant by fastening of the safety pin through the diaper or other material.

In FIG. 9 I have illustrated another form of the main body portion of the safety pin wherein the body portion 2 may be molded in two parts as indicated at 34 and 35 and heat sealed or adhesively secured together as is common practice. In this form of the invention there is no slot in the upper edge of the body portion but there is illustrated the bore 23, shoulder 24 and enlarged bore 25 with the socket 26 therein, each body portion 34 and 35 being provided with one-half of the grooves to provide the bores. The longitudinal bore 18 and the socket 15 are also provided in the same manner.

It will be obvious from the foregoing that I have provided an improved safety pin wherein the pin may be moved from open to closed position without danger of pricking the infant or user of the pin. Even should an infant swallow a pin of this character, in closed position there are no sharp points and in open position there are no sharp points which would injure the infant. Even if partially closed, the sharp point would not be apt to injure the infant. The principal feature of this invention, however, is in the elimination of injury to the infant by pricking the same during placement of the diaper on the infant.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A safety pin of the character described comprising,
   (a) an elongated main body member having a closed side and an opening in its other side forming a compartment for the material to be fastened, said open side having portions facing each other, one of said portions having a socket therein and the other having a longitudinal bore therethrough, said closed side of the body member having an elongated bore therein,
   (b) a pin portion including parallel extending shanks slidably engaging said main body member, one of said shanks being pointed and extending through the bore in the open side portion of said main body and being shorter than the other shank so that when the pin is in open position the said pointed end will be within the longitudinal bore of one of said facing portions, the other shank engaging in said elongated bore in the said main body member a portion of the elongated bore in the body member being parallel with the bore through one of the facing portions to guide the pointed end of the shank into the socket in the other facing portion and a portion of said longitudinal bore being inclined upwardly away from said parallel portion to place a tension on said shank therein outwardly of said parallel portion when the pin is in closed position,
   (c) means retaining the pin portion in engagement with the main body member when in open position, and
   (d) means retaining the pin in closed position.

2. The combination of claim 1 wherein the means for retaining the pin in closed position includes an enlarged portion on the end of the shank engaging in said bore in the closed side of the main body member and said bore has an enlarged portion inclined away from the pointed shank and terminates in a depression in said bore in which said enlarged end of the shank engages.

3. A safety pin of the character described comprising,
   (a) an elongated main body member having a forward and a rear end having a flat surface, a closed side and an opening in its other side forming a compartment for the material to be fastened, said open side having portions facing each other, one of said portions having a socket therein and the other having a longitudinal bore therethrough in alignment with said socket, said closed side of the body member having an elongated bore extending through the rear end and terminating near the front end,
   (b) a pin portion including parallel extending shanks having free ends and their other ends connected by a single curved portion, the connected portion of said shanks having a body portion provided with a face adapted to engage the flat surface of the rear end of the main body member, one of said shanks being pointed and extending through the bore in the open side portion of said body, the other shank being longer and having an enlarged end and engaging in said elongated bore in the said body member, (c) said last named bore having an offset portion spaced from said rear end against which the enlarged end of said shank engages to retain the pin portion in engagement with the main body member when in open position, the shorter pointed end of the shank of said pin being entirely enclosed in said bore in the facing portion of said rear end when the pin is in open position, and (d) a second offset portion in said last named bore at the terminal end thereof in which said enlarged end engages to retain the pin in closed position, (e) said elongated bore in the main body member from the rear end to said first offset portion being parallel to said bore through one of the said portions of the open side of the main body member to maintain said pointed shank in alignment with said socket in the other said portion of the open side of said main body member, (f) said elongated bore in said closed side of the body member being inclined from said first offset portion away from said compartment to cause tension on said shank with the enlarged end to urge said enlarged end into said socket at the terminal end of said bore.

4. A safety pin comprising:

(a) a wire having spaced apart shanks connected at one end with the other ends free and extending substantially in the same direction from the connected end, one of said shank other ends being pointed, (b) a guard and guide member having the shape of a wide-mouthed U with arms forming the sides of the U, said guard and guide member having a longitudinal length at the closed side and across the arms greater than the length of the shanks, (c) said arms having aligned bores adjacent ends thereof, (d) a bore in the closed side of the U adjacent one end of the guard and guide member and parallel to the aligned bores in said arms, (e) said bores in the arms being adapted to receive the pointed shank and the bore in the closed side being adapted to receive the other shank with longitudinal sliding movement of the shanks closing the safety pin across the open side of the U, (f) said bore in the closed side of the U terminating in an enlarged longitudinal channel having a surface inclined away from the open side of the U and extending to adjacent the other end of said guard and guide member, (g) and an enlarged portion on the other shank slidably engaging said inclined surface increasing the spacing of said free ends of the shanks as the shanks are moved to pin closing position, and providing a frictional contact tending to retain the shanks in selected position, (h) and a recess in said channel receiving said enlarged portion when the pin is in closed position and resisting opening movement of said shanks.

References Cited by the Examiner

UNITED STATES PATENTS

| 383,719 | 5/88 | Ganter | 24—162 |
|---|---|---|---|
| 2,138,869 | 12/38 | Lockwood | 24—158 |
| 2,627,096 | 2/53 | Alessi | 24—158 |

DONLEY J. STOCKING, *Primary Examiner.*